US012331910B2

(12) United States Patent
Cao

(10) Patent No.: US 12,331,910 B2
(45) Date of Patent: Jun. 17, 2025

(54) LIGHT-EMITTING DEVICE INSIDE TOY

(71) Applicant: Rongchang Cao, Shijiazhuang (CN)

(72) Inventor: Rongchang Cao, Shijiazhuang (CN)

( * ) Notice: Subject to any disclaimer, the term of this patent is extended or adjusted under 35 U.S.C. 154(b) by 316 days.

(21) Appl. No.: 18/134,364

(22) Filed: Apr. 13, 2023

(65) Prior Publication Data

US 2024/0342626 A1 Oct. 17, 2024

(51) Int. Cl.
*A63H 5/00* (2006.01)
*A63H 33/22* (2006.01)
*F21V 21/00* (2006.01)

(52) U.S. Cl.
CPC ............... *F21V 21/00* (2013.01); *A63H 5/00* (2013.01); *A63H 33/22* (2013.01)

(58) Field of Classification Search
None
See application file for complete search history.

(56) References Cited

U.S. PATENT DOCUMENTS 5,669,702 A * 9/1997 Wang ...................... F21V 3/023 446/485
7,147,536 B1 * 12/2006 Hartelius ................ F21V 3/023 446/485
7,204,740 B2 * 4/2007 Petell ...................... G09F 21/06 362/362
7,311,411 B2 * 12/2007 VanderSchuit .... A47G 23/0216 362/102
8,297,778 B2 * 10/2012 Jeffrey ................... A63H 27/10 362/186
9,199,180 B2 * 12/2015 Chen ......................... F21K 9/00
9,498,733 B2 * 11/2016 Henrik ................... A63H 27/10
10,717,017 B2 * 7/2020 Publicover ............. A63H 27/10
11,649,956 B2 * 5/2023 Hetzroni ............... F21S 10/023 362/394
2004/0170014 A1 * 9/2004 Pritchard ................ F21V 21/06 362/555
2004/0174718 A1 * 9/2004 Ohlund ..................... B64B 1/50 362/565
2004/0233674 A1 * 11/2004 Vanderschuit .......... G09F 21/10 362/352
2005/0269442 A1 * 12/2005 Nguyen ................. A63H 27/10 244/31
2006/0039138 A1 * 2/2006 Oxborrow ............... F21V 3/023 362/253

(Continued)

*Primary Examiner* — Paul A D'Agostino
(74) *Attorney, Agent, or Firm* — Birchwood IP

(57) ABSTRACT

The present application relates to a light-emitting device inside a toy, comprising a fixed housing and a battery, wherein a battery chamber is arranged inside the fixed housing, and the battery is arranged in the battery chamber, the fixed housing comprises a base and a mounting seat, the base and the mounting seat are detachably connected by a fixing component, wherein a light-emitting device is connected to one side of the base away from the mounting seat, and a control device is arranged in the mounting seat, wherein the control device is electrically connected to the battery, and the control device is electrically connected to the light-emitting device. The purpose of the present application is to solve the technical problems that the light emitter inside the existing toy is inconvenient to disassemble and easily cause air leakage by arranging the base and the mounting base detachably.

7 Claims, 3 Drawing Sheets

(56) References Cited

U.S. PATENT DOCUMENTS

| | | | | |
|---|---|---|---|---|
| 2006/0083285 | A1 * | 4/2006 | Lopez-Ethnasois | A63H 33/22 373/93 |
| 2006/0104070 | A1 * | 5/2006 | Carito | A63H 27/10 362/800 |
| 2010/0041303 | A1 * | 2/2010 | Koonce, Jr. | A63H 27/10 446/220 |
| 2010/0246165 | A1 * | 9/2010 | Diaz | A63H 33/22 362/183 |
| 2011/0104977 | A1 * | 5/2011 | Forte | A63H 33/18 446/47 |
| 2011/0164411 | A1 * | 7/2011 | Sparing | F21L 4/00 362/197 |
| 2012/0314406 | A1 * | 12/2012 | Halliburton | F21V 3/026 362/382 |
| 2017/0207429 | A1 * | 7/2017 | Wang | H01M 10/488 |
| 2017/0338521 | A1 * | 11/2017 | Zhang | H01M 50/159 |
| 2018/0202620 | A1 * | 7/2018 | Soofer | F21S 4/20 |

* cited by examiner

LIGHT-EMITTING DEVICE INSIDE TOY

TECHNICAL FIELD

The present application relates to the technical field of light emitters, in particular to a light-emitting device inside a toy.

BACKGROUND

Children's toys are designed and manufactured for children of a specific age group, and their characteristics are related to children's age and intellectual stage. The use of children's toys is based on the premise of a certain adaptability. Due to its wide use, a musical instrument that can emit light inside is now proposed.

Most of the existing light emitters are placed inside the toy, which is inconvenient to disassemble, and it is easy to cause air leakage, so the existing light emitter devices cannot meet people's needs well. In view of the above situation, technological innovation is carried out on the basis of the existing light-emitting device.

SUMMARY

The purpose of the present application is to provide a light-emitting device inside a toy to solve the technical problems that the light-emitting device inside the existing toy is inconvenient to disassemble and easily causes air leakage.

In order to achieve the above object, the technical solution adopted in this application is: a light-emitting device inside a toy, comprising a fixed housing and a battery, wherein a battery chamber is arranged inside the fixed housing, and the battery is arranged in the battery chamber, the fixed housing comprises a base and a mounting seat, the base and the mounting seat are detachably connected by a fixing component, wherein a light-emitting device is connected to one side of the base away from the mounting seat, and a control device is arranged in the mounting seat, wherein the control device is electrically connected to the battery, and the control device is electrically connected to the light-emitting device.

Further, the light-emitting device comprises a connecting pipe arranged on one side of the base and a light strip connected to the connecting pipe, the light strip is electrically connected to the battery.

Further, the battery chamber comprises a first chip slot arranged in the base and a second chip slot arranged in the mounting base, the first chip slot is connected to the second chip slot by a conductive member.

Further, the conductive member is an electromagnetic magnet, and the conductive member is arranged on the side of the base close to the mounting seat.

Further, a through hole is formed on the side of the mounting base away from the base Further, the control device comprises a control circuit board and a push-type music player, and the control device is movably arranged in the mounting seat Further, the fixing component comprises a first hook arranged on an outer surface of the base and a second hook arranged on an inner wall of the mounting seat, wherein the first hook and the second hook are engaged with each other.

Through the above-mentioned technical solution, compared with the prior art, the present application has the following beneficial effects:

1. The base and the mounting seat are provided with fixing components that cooperates with each other, and the base and the mounting seat can be disassembled more conveniently while the base and the mounting seat are tightly combined through the fixing component, so as to facilitate the replacement of the internal battery.

2. A through hole is formed on one side of the mounting seat, and a control device is arranged in the mounting seat. The control device is a control circuit board and a push-type music player. The push-type music player can be turned on or off through the through hole, and achieves the effect of sound generation by the control circuit board electrically connected with the battery. Through the arrangement of the push-type music player, the device can produce sound when it is installed inside the toy.

3. The control device and the light-emitting device are electrically connected. When the control device is turned on or off, the light-emitting device will be turned on or off at the same time. The light-emitting device is a light strip, and when it is arranged inside the toy, the light strip can generate light in a large area inside the toy.

4. The first chip slot and the second chip slot are respectively arranged inside the base and the mounting seat. The first chip slot and the second chip slot are in contact with the positive and negative electrodes of the internal battery through the conductive parts to make the device work normally. The conductive parts are electromagnetic magnet, which makes the connection between the first chip slot and the second chip slot more tightly, and facilitates assembly and disassembly.

BRIEF DESCRIPTION OF DRAWINGS

In order to more clearly illustrate the technical solutions in the embodiments of the present application or the prior art, the following will briefly introduce the accompanying drawings that need to be used in the description of the embodiments or the prior art. Obviously, the accompanying drawings in the following description are only some embodiments of the application. For those skilled in the art, other drawings can also be obtained according to the structures shown in these drawings without any creative effort.

REFERENCE SIGNS

Figure 1:
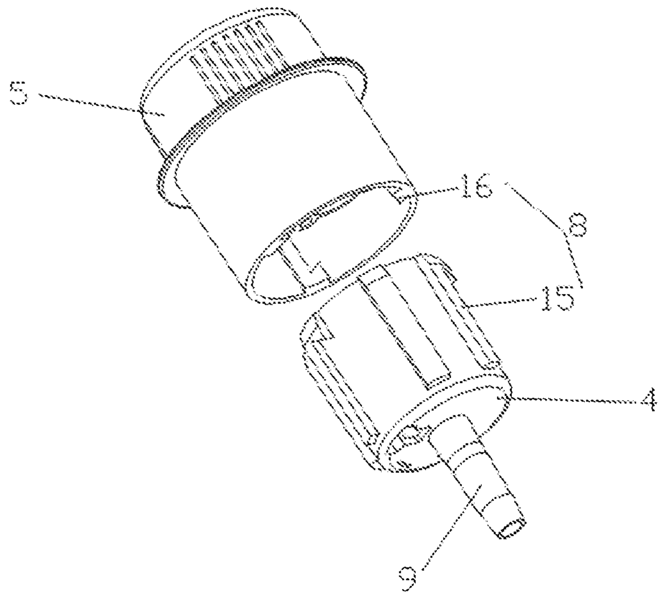
FIG. 1 is a structural diagram of the present application.

1. Fixed housing; 2. Battery; 3. Battery chamber; 4. Base; 5. Mounting seat; 6. Light-emitting device; 7. Control device; 8. Fixing component; 9. Connecting pipe; 11. Conductive part; 12. Through hole; 13. First chip slot; 14. Second chip slot; 15. First hook; 16. Second hook; 17. Toy; 18. Sealing member.

The implementation, functional features and advantages of the present application will be further described in conjunction with the embodiments and with reference to the accompanying drawings.

DETAILED DESCRIPTION

The technical solution in the embodiment of the present application will be clearly and completely described below in conjunction with the accompanying FIGS. 1-5 in the embodiment of the present application. Apparently, the described embodiments are only some of the embodiments of the present application, rather than all the embodiments. Based on the embodiments in the present application, all other embodiments obtained by a person skilled in the art without creative efforts fall within the protection scope of the present application.

It should be noted that all directional indications (such as up, down, left, right, front, back . . . ) in the embodiments of the present application are only used to explain the relative positional relationship and movement of the various components in a certain posture (as shown in the figure), if the specific posture changes, the directional indication will also change accordingly.

In addition, the descriptions involving "first", "second" and so on in the present application are only for the purpose of description, and should not be understood as indicating or implying their relative importance or implicitly specifying the quantity of the indicated technical features. Thus, the features defined as "first" and "second" may explicitly or implicitly include at least one of these features. In addition, the technical solutions of the various embodiments can be combined with each other, but it must be based on the realization of those skilled in the art. When the combination of technical solutions contradicts each other or cannot be realized, it should be considered that the combination of technical solutions does not exist, nor is it within the protection scope of the present application.

As shown in FIG. 1-5: a light-emitting device inside a toy comprising a fixed housing 1 and a battery 2, a battery chamber 3 is arranged inside the fixed housing 1, the battery 2 is arranged in the battery chamber 3, the fixed housing 1 comprises a base 4 and a mounting seat 5, the base 4 and the mounting seat 5 are detachably connected through the fixing components 8, a light-emitting device 6 is connected to one side of the base 4 away from the mounting seat 5, and the mounting seat 5 is provided with a control device 7, wherein the control device 7 is electrically connected to the battery 2, the control device 7 is electrically connected to the light-emitting device 6.

Figure 3:
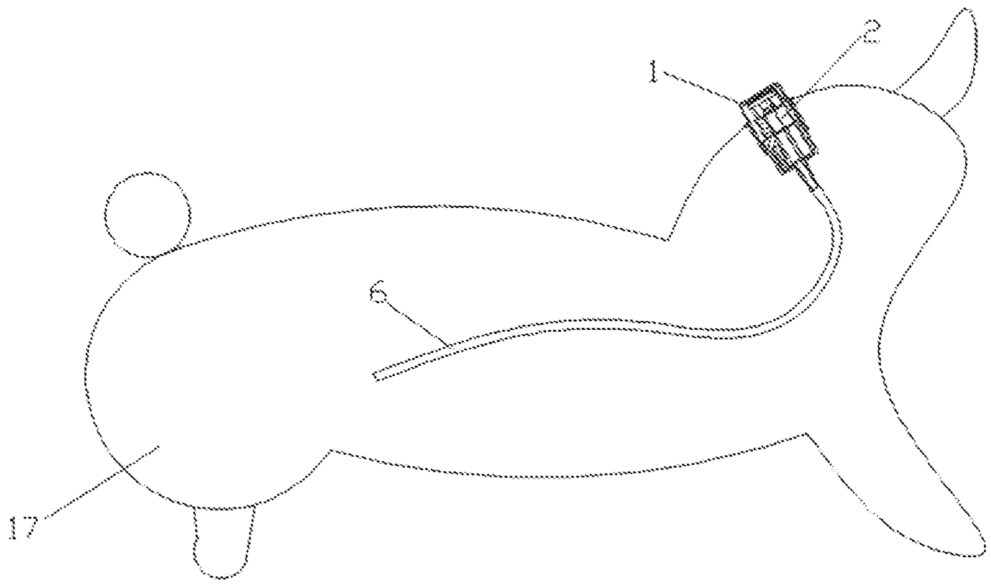
FIG. 3 is a schematic diagram of the cross-sectional structure of the present application.

Working principle: During use, as shown in FIG. 3: fixed housing 1 is arranged on the opening of toy 17, so that the fixed housing 1 could be inserted into the toy 17. By pre-setting the sealing member 18 at the opening of the toy 17, the overall airtightness of the device can be good, and no air leakage will occur. One side of the base 4 is connected to the light-emitting device 6, the light-emitting device 6 is a light strip, and one end of the light strip is electrically connected to the control device 7 through the connecting pipe. Chips are arranged above and below the inside of the battery chamber 3, and the battery 2 is in contact with the chips. A control device 7 is arranged in the mounting seat 5, and the control device 7 is connected to the positive and negative poles of the battery 2 through the conductive parts 11, so that the device can make sound normally. When you need to turn on or off the light strip and music, you only need to press the control device 7 through the through hole 12. Through the conductive parts, the control device 7 will make the light-emitting device 6 electrically connected to it emit light. When it is necessary to replace the battery, the mounting seat 5 and the base 4 are separated by the fixing components, and the base 4 can still be fixed on the toy, so it is convenient for subsequent disassembly and maintenance, and also convenient for battery replacement and use. As a result, the technical problems of inconvenient disassembly of the light emitter inside the existing toy and easy air leakage are solved.

Figure 4:
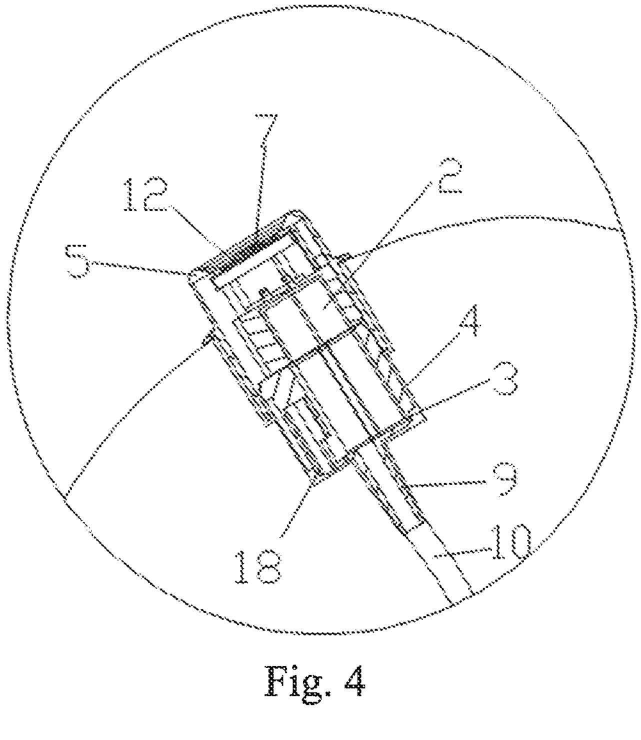
FIG. 4 is a partially enlarged structural schematic diagram of FIG. 3 of the present application.

As a preferred solution, as shown in FIG. 4, the light-emitting device 6 comprises a connecting pipe 9 arranged on one side of the base 4 and a light strip 10 connected to the connecting pipe 9, and the light strip 10 is electrically connected to the battery 2.

The control device 7 is electrically connected to the light-emitting device 6, and when the control device 7 is turned on or off, the light-emitting device 6 will be turned on or off at the same time. The light-emitting device 6 is a light strip, and one end of the light strip is connected to the inside of the base 4 through a connecting pipe 9. The connecting pipe 9 is integrally connected with the base 4, and the light strip and the connecting pipe 9 are detachably connected to facilitate the replacement of the light strip. When it is arranged inside the toy, the light strip can generate light in a large range inside the toy.

Figure 2:
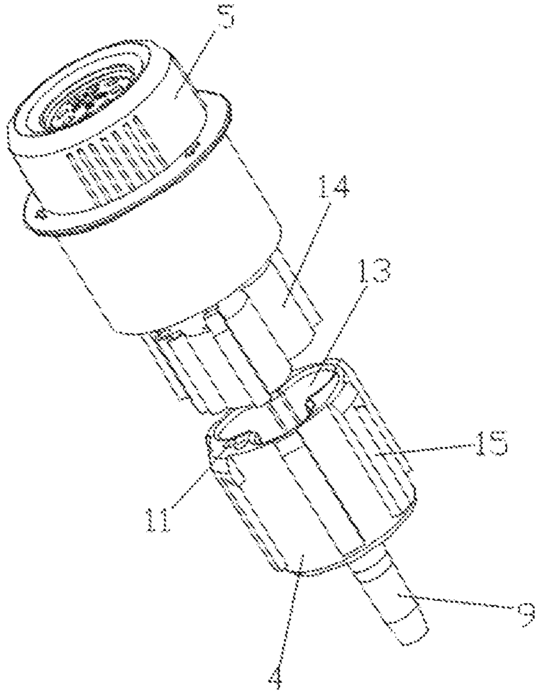
FIG. 2 is an explosive structural schematic diagram of the present application.

As a preferred solution, as shown in FIG. 2, the battery chamber 3 comprises a first chip slot 13 arranged in the base 4 and a second chip slot 14 arranged in the mounting seat 5, the first chip slot 13 is connected to the second chip slot 14 through the conductive part 11.

Inside the base 4 and the mounting seat 5 are respectively provided with a first chip slot 13 and a second chip slot 14, the first chip slot 13 is directly formed in the base 4, and the second chip slot 14 is fixedly connected inside the mounting seat 5. The first chip slot 13 and the second chip slot 14 are connected to the positive and negative poles of the battery through the conductive part 11, so that the device can work normally. The conductive part 11 is an electromagnetic magnet, which makes the connection between the first chip slot 13 and the second chip slot 14 tighter, and facilitates assembly and disassembly.

As a preferred solution, as shown in FIG. 2, the conductive part 11 is an electromagnetic magnet, and the conductive part 11 is arranged on a side of the base 4 close to the mounting base 5.

The outer edge of the first chip slot 13 is provided with a conductive part 11, and the outer edge of the second chip slot 14 and the first chip slot 13 are provided with a connecting member that can be electrically connected to the conductive part 11 at a position corresponding to the conductive part 11. By mutual adsorption between the connecting member and the conductive part 11, the connection between the two can be increased to facilitate disassembly, and the two can also be in an electrically connected state.

As a preferred solution, as shown in FIG. 2, a through hole 12 is formed on the side of the mounting seat 5 away from the base 4.

The lower end of the through hole 12 is sequentially provided with a control device 7 and the second chip slot 14 sequentially from top to bottom. By forming the through hole 12, the control device 7 can be more conveniently controlled, thereby making it more convenient to turn on or off the light source and sound and light. When in use, the effect of turning on or off the light source or sound and light can be achieved only by pressing the control device 7.

As a preferred solution, as shown in FIG. 4: the control device 7 comprises a control circuit board and a push-type music player, and the control device 7 is movably arranged in the mounting seat 5.

The control circuit board is mounted on an outer side of the second chip slot 14 in the mounting seat 5 close to the through hole 12, and is electrically connected to the battery in the second chip slot 14. The push-type music player and the light-emitting device can be controlled through the control circuit board.

As a preferred solution, as shown in FIG. 1: the fixing component 8 comprises a first hook 15 arranged on the outer surface of the base 4 and a second hook 16 arranged on the inner wall of the mounting seat 5, the first hook 15 and the second hooks 16 are engaged with each other.

As shown in FIG. 1: the base 4 and the mounting seat 5 are fixed to each other by providing the first hook 15 and the second hook 16 that are engaged with each other. When it needs to be disassembled, the mounting seat 5 is rotated so that the second hook 16 on the mounting seat 5 is separated from the restriction of the first hook 15, so as to achieve the effect of disassembly. When it needs to be assembled, only the mounting seat 5 needs to be rotated, and the second hook 16 is re-engaged with the first hook 15.

Figure 5:
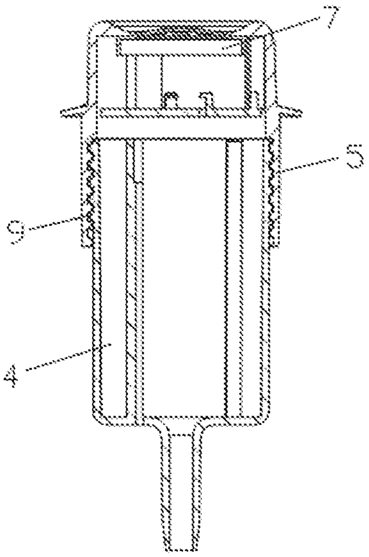
FIG. 5 is a structural schematic diagram of the present application in another state.

As a preferred solution, as shown in FIG. 5: the base 4 and the mounting seat 5 can also be detachably connected by threaded connection, and when disassembly or assembly is required, the mounting seat 5 can be disassembled only by rotating the mounting seat 5, so that it is more convenient to replace the battery.

The above descriptions are only preferred embodiments of the present application, and are not intended to limit the protection scope of the present application. Under the application concept of this application, any equivalent structural transformation made by using the contents of this application specification and drawings, or directly/indirectly used in other related technical fields are included in the protection scope of the present application.

What is claimed is:

1. A light-emitting device inside a toy, comprising a fixed housing (1) and a battery (2), a battery chamber (3) is arranged inside the fixed housing (1), and the battery (2) is arranged in the battery chamber (3), wherein the fixed housing (1) comprises a base (4) and a mounting base (5), the base (4) and the mounting base (5) are detachably connected by fixing components (8), and a light-emitting device (6) is connected to one side of the base (4) away from the mounting base (5), and a control device (7) is arranged in the mounting base (5), the control device (7) is electrically connected with the battery (2), and the control device (7) is electrically connected with the light emitting device (6).

2. The light-emitting device inside a toy according to claim 1, wherein the light-emitting device (6) comprises a connecting pipe (9) arranged on one side of the base (4) and a light strip (10) connected to the connecting pipe (9), the light strip (10) is electrically connected to the battery (2).

3. The light-emitting device inside a toy according to claim 1, wherein the battery chamber (3) comprises a first chip slot (13) arranged in the base (4) and a second chip slot (14) arranged in the mounting base (5), the first chip slot (13) is connected to the second chip slot (14) by a conductive member (11).

4. The light-emitting device inside a toy according to claim 3, wherein the conductive member (11) is an electromagnetic magnet, and the conductive member (11) is arranged on the side of the base (4) close to the mounting seat (5).

5. The light-emitting device inside a toy according to claim 4, wherein a through hole (12) is formed on the side of the mounting base (5) away from the base (4).

6. The light-emitting device inside a toy according to claim 1, wherein the control device (7) comprises a control circuit board and a push-type music player, and the control device (7) is movably arranged in the mounting seat (5).

7. The light-emitting device inside a toy according to claim 1, wherein the fixing component (8) comprises a first hook (15) arranged on an outer surface of the base (4) and a second hook (16) arranged on an inner wall of the mounting seat (5), wherein the first hook (15) and the second hook (16) are engaged with each other.

* * * * *